(12) United States Patent
Farokhi et al.

(10) Patent No.: US 10,585,109 B2
(45) Date of Patent: Mar. 10, 2020

(54) SYSTEMS, METHODS, AND DEVICES FOR FLUID DATA SENSING

(71) Applicant: University of Kansas, Lawrence, KS (US)

(72) Inventors: Saeed Farokhi, Lawrence, KS (US); Ray R. Taghavi, Lawrence, KS (US); Shawn S. Keshmiri, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 16/030,467

(22) Filed: Jul. 9, 2018

(65) Prior Publication Data

US 2018/0321272 A1  Nov. 8, 2018

(51) Int. Cl.
| | |
|---|---|
| *G01P 5/165* | (2006.01) |
| *G01F 1/05* | (2006.01) |
| *G01F 1/06* | (2006.01) |
| *G01F 1/46* | (2006.01) |
| *G01K 13/02* | (2006.01) |
| *G01L 19/00* | (2006.01) |

(52) U.S. Cl.
CPC ............. *G01P 5/165* (2013.01); *G01F 1/05* (2013.01); *G01F 1/46* (2013.01); *G01K 13/02* (2013.01); *G01K 13/028* (2013.01); *G01L 19/0092* (2013.01); *G01K 2013/024* (2013.01); *G01L 2019/0053* (2013.01)

(58) Field of Classification Search
CPC .................................. G01F 1/05; G01P 5/165
See application file for complete search history.

(56) References Cited

U.S. PATENT DOCUMENTS

| | | | |
|---|---|---|---|
| 4,718,273 | A | 1/1988 | McCormack |
| 5,025,661 | A | 6/1991 | McCormack |
| 5,046,360 | A | 9/1991 | Hedberg |
| 5,233,865 | A | 8/1993 | Rossow |
| 5,331,849 | A | 7/1994 | Hedberg et al. |
| 5,544,526 | A | 8/1996 | Baltins et al. |
| 5,731,507 | A | 3/1998 | Hagen et al. |
| 6,076,963 | A | 6/2000 | Menzies et al. |

(Continued)

FOREIGN PATENT DOCUMENTS

| | | |
|---|---|---|
| CA | 2494458 | 2/2004 |

OTHER PUBLICATIONS

U.S. Appl. No. 62/006,437, filed Jun. 2, 2014, Farokhi et al.

(Continued)

*Primary Examiner* — Jewel V Dowtin
(74) *Attorney, Agent, or Firm* — Ray Quinney & Nebeker P.C.; Paul N. Taylor

(57) ABSTRACT

A fluid sensing device includes an outer body having a fore side, an aft side, and an interior space, the outer body including a fluid inlet disposed at the fore side; an inner body extending at least partially out of the fluid inlet of the outer body along a longitudinal axis; one or more vents disposed aft of the fluid inlet to allow passage of fluid through the fluid sensing device; and at least one load sensor coupled to the inner body to measure a fluid drag force on the inner body, wherein the inner body is configured to induce the Coanda effect in at least a portion of a fluid contacting the inner body at an angle transverse to a longitudinal axis of the inner body.

20 Claims, 12 Drawing Sheets

(56) References Cited

U.S. PATENT DOCUMENTS

| | | | |
|---|---|---|---|
| 6,253,166 | B1 | 6/2001 | Whitmore et al. |
| 6,487,917 | B1 | 12/2002 | Van Cleve et al. |
| 6,490,510 | B1 | 12/2002 | Choisnet |
| 6,694,279 | B2 | 2/2004 | Cunningham et al. |
| 6,817,240 | B2 | 11/2004 | Collot et al. |
| 6,892,584 | B2 | 5/2005 | Gilkison et al. |
| 6,901,814 | B2 | 6/2005 | Vozhdaev et al. |
| 7,124,630 | B2 | 10/2006 | Hanson et al. |
| 7,213,470 | B2 * | 5/2007 | Gebhardt .............. G01F 1/8409 73/861.357 |
| 7,490,510 | B2 | 2/2009 | Agami et al. |
| 7,509,879 | B2 * | 3/2009 | Rieder .................. G01F 1/8409 73/861.357 |
| 8,100,022 | B2 | 1/2012 | Choisnet |
| 9,541,429 | B2 * | 1/2017 | Farokhi .................... G01P 5/165 |
| 2003/0145661 | A1 | 8/2003 | Taranto |
| 2017/0122973 | A1 | 5/2017 | Farokhi et al. |

OTHER PUBLICATIONS

U.S. Appl. No. 62/100,822, filed Jan. 7, 2015, Farokhi et al.

Farokhi et al., Bio-Inspired Airdata Sensing Probe for High Angles of Attack and Sideslip, The University of Kansas, Lawrence, Kansas 66045, American Institute of Aeronautics and Astronautics, pp. 1-9.

Farokhi et al., Bio-Inspired Airdata Sensing Probe for High Angles of Attack and Sideslip, ASM: Aerodynamic Measurement Technology Conference, American Institute of Aeronautics and Astronautics SciTech 2015, pp. 1-12.

Geenen et al., A System for Testing Airdata Probes at High Angles of Attack Using a Ground Vehicle, NASA Ames Research Center Dryden Flight Research Center, Edwards California, pp. 1-15.

Krishna et al., Computation Curves for Air Data System, Aeronautical Development Agency, Bangalor, India, Defence Science Journal, vol. 52, No. 1, Jan. 2002, pp. 65-71.

Larson, Terry J., Evaluation of a Flow Direction Probe and a Pitot-static Probe Airplane at High Angles Sideslip on the F-I4 of Attack and Sideslip, NASA Technical Memorandum 84911, Ames Research Center, Dryden Flight Research Facility, Edwards, California 93523, Mar. 1984, pp. 1-40.

Masud, J., Afgan, I., Performance Characteristics of Flush Angle-of-Attack Measurement System Integrated on a Pitot Tube, Department of Mechanical and Aerospace Engineering, Institute of Avionics and Aeronautics, Air Unviersity, Islamabad 44000, Pakistan, AIAA 2009-1077, Engineering Applications of Computational Fluid Mechanics vol. 4, No. 4, Jun. 23, 2010, pp. 549-557.

State-of-the-Art Air Data Products Solution Guide, SpaceAge Control, Palmdale, California 93550, pp. 1-12.

Whitmore, Stephen A., Development of a Pneumatic High-Angle-of-Attack Flush Airdata Sensing (HI-FADS) System, NASA Dryden Flight Research Facility, Edwards, California, NASA Technical Memorandum 104241, 1991, pp. 1-25.

U.S. Appl. No. 14/278,347, dated Sep. 1, 2016, Notice of Allowance.

U.S. Appl. No. 15/400,708, dated Oct. 16, 2017, Office Action.

U.S. Appl. No. 15/400,708, dated Mar. 9, 2018, Notice of Allowance.

* cited by examiner

SYSTEMS, METHODS, AND DEVICES FOR FLUID DATA SENSING

BACKGROUND

The present disclosure relates generally to sensing one or more fluid parameters. More specifically, the present disclosure relates to systems, devices, and methods for accurately measuring fluid flow velocity and/or other fluid parameters at high/low velocities and/or at indirect angular flows relative to a measurement probe.

Fluid flow velocity measurements are typically determined by measuring pressure using some variation of a Pitot tube. The accuracy of these measurements, however, may be limited at high/low fluid flow velocities and/or in conditions when the flow is not parallel to the measuring device. For example, in aircraft or marine craft applications, measurement accuracy may suffer when the craft is changing direction or otherwise inducing pitch and/or yaw angles, such as during intense maneuvering or in loss of control situations, which are often among the situations where reliable data is typically most needed.

In order to operate in such dynamic fluid flow environments, typical fluid flow sensor systems require multiple sensors positioned at separate locations on the craft or other measuring structure as well as complex compensation calculations to interpret the separate readings and compensate for angular flow errors in the sensor output. The requirement of multiple sensors and the necessity of gathering and interpreting separate signals into a meaningful measurement undesirably adds to the cost and complexity of fluid sensing, particularly in dynamic fluid flow environments.

In addition, typical devices used for measuring fluid flow parameters are configured to measure a single parameter only and/or are unable to provide accurate readings at high/low fluid flow velocities and/or indirect flow angles. Typical systems intended to measure more than one fluid parameter may thus require multiple sensors, and the use of multiple sensors may result in readings that are not common to a localized area and/or that are not simultaneous, limiting the usefulness of the resulting readings for measuring certain fluid parameters.

Furthermore, inaccuracy of typical devices used for measuring angular fluid flow parameters propagates into estimation of local wind velocity and causes overestimation or underestimation of the wind speed.

BRIEF SUMMARY

The present disclosure relates to devices, systems, and methods for data sensing in a flowing fluid environment. One or more embodiments of the present disclosure may be configured to provide accurate fluid flow velocity readings (e.g., by measuring pressure) and/or other fluid parameters at high/low fluid flow velocities and/or at high flow angularity. One or more embodiments may be useful for monitoring the status and/or performance of a machine intended for operation in an environment that includes fluid flow (e.g., a fluid of air, water, other gasses, and/or other liquids).

One or more embodiments relate to a fluid sensing device, including: an outer body having a fore side, an aft side, and an interior space, the outer body including a fluid inlet disposed at the fore side; an inner body extending at least partially out of the fluid inlet of the outer body along a longitudinal axis; one or more vents disposed aft of the fluid inlet to allow passage of fluid through the fluid sensing device; and at least one load sensor coupled to the inner body to measure a fluid drag force on the inner body, wherein the inner body is configured to induce the Coanda effect in at least a portion of a fluid contacting the inner body at an angle transverse to a longitudinal axis of the inner body.

One or more embodiments relate to a fluid sensing device, including: an outer body having a fore side, an aft side, an interior space, and an interior aft portion that defines an annular stagnation zone, the outer body including a fluid inlet disposed at the fore side and an aft vent disposed at the aft side; and an inner body extending along a longitudinal axis, the inner body having a hollow interior housing one or more inner body sensors, wherein the inner body is configured to induce the Coanda effect in at least a portion of a fluid contacting the inner body at an angle transverse to a longitudinal axis of the inner body.

One or more embodiments relate to a fluid sensing device, including: an outer body having a fore side, an aft side, an interior space, and an interior aft portion that defines an annular stagnation zone, the outer body including a fluid inlet disposed at the fore side; an inner body extending at least partially out of a fluid inlet of the outer body along a longitudinal axis, the inner body being movable relative to the outer body; one or more vents disposed aft of the fluid inlet to allow passage of fluid through the fluid sensing device; an aft body positioned at least partially within the interior space and defining an aft vent around the aft body, the aft vent being between the aft body and the annular stagnation zone; and at least one load sensor coupled to the inner body to measure a fluid drag force on the inner body, wherein the inner body is configured to induce the Coanda effect in at least a portion of a fluid contacting the inner body at an angle transverse to a longitudinal axis of the inner body.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. For better understanding, like elements have been designated by like reference numbers throughout the various accompanying figures. Though some elements in some figures have the same reference number as elements in other figures, these elements may be the same or may differ. While some of the drawings are schematic representations of concepts, at least some of the drawings may be drawn to scale. Understanding that these drawings depict only typical embodiments of the disclosure and are not therefore to be considered limiting of its scope, the embodiments will be described and explained with additional specificity and detail through the use of the accompanying drawings in which.

DETAILED DESCRIPTION

The present disclosure relates to devices, systems, and methods for data sensing in a flowing fluid environment. One or more embodiments of the present disclosure may be configured to provide accurate fluid flow velocity readings (e.g., by measuring pressure) and/or other fluid parameters at high/low fluid flow velocities and/or at high flow angularity. One or more embodiments may be useful for monitoring the status and/or performance of a machine intended for operation in an environment that includes fluid flow (e.g., a fluid of air, water, other gasses, and/or other liquids). For example, one or more embodiments may be useful for sensing fluid parameters in an aircraft, marine craft, turbine, propeller, impeller, wind farm, aerospace, industrial tool, industrial, and/or wind tunnel application, including testing and/or monitoring of various elements or aspects of such applications. One or more embodiments may relate to airflow sensors (e.g., for use on an aircraft).

One or more embodiments of the present disclosure may be capable of measuring, at levels of sufficient accuracy, both total temperature and total pressure locally (e.g., within the same probe) and/or simultaneously for determining the thermodynamic parameter local entropy.

Figure 1:
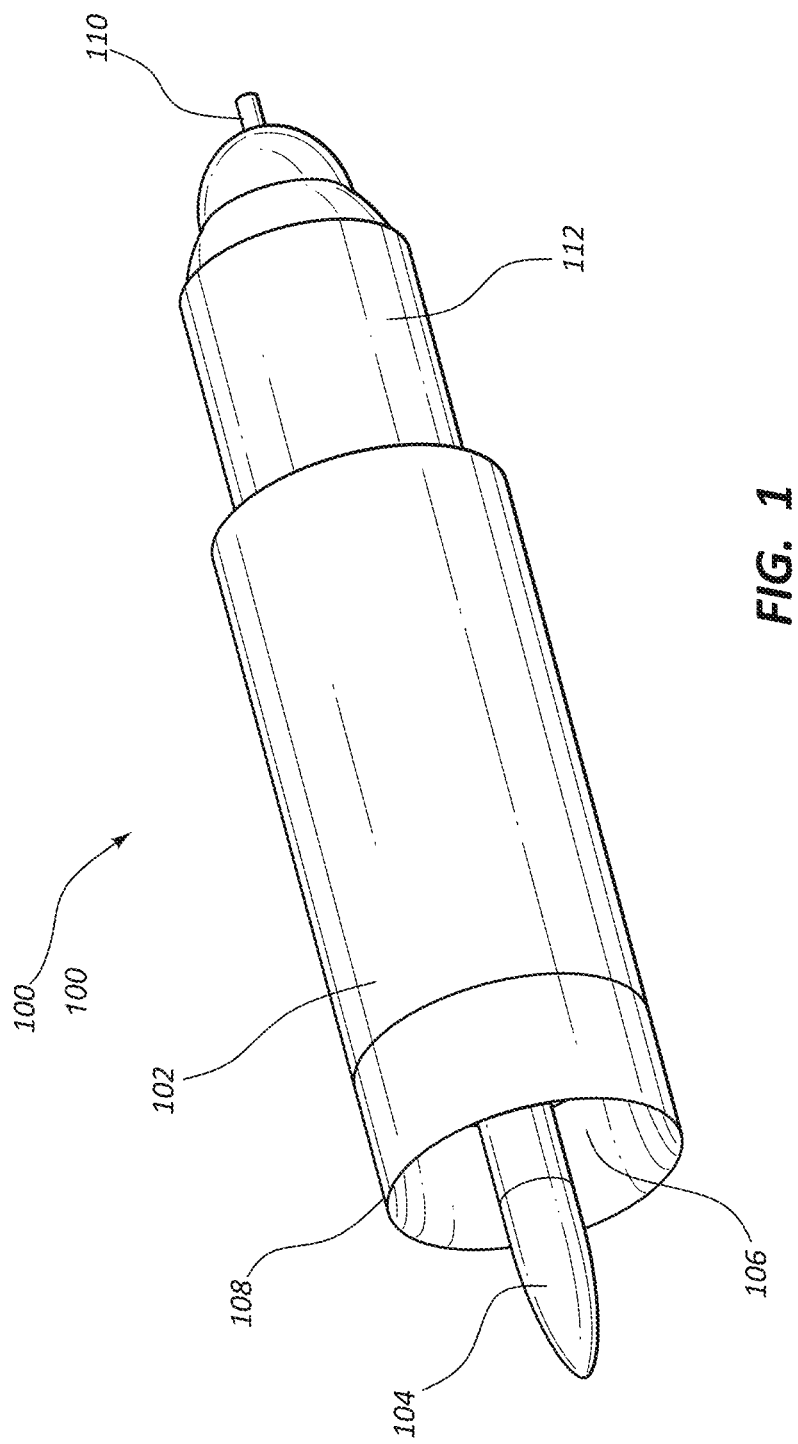
FIG. 1 illustrates an embodiment of a fluid sensing device according to the present disclosure.

FIG. 1 illustrates an embodiment of a fluid sensing device 100 including an outer body 102 and an inner body 104 extending at least partially out of the outer body 102. As shown, the outer body 102 can be formed with a fluid inlet 106 disposed at the fore side 108 of the fluid sensing device 100. As described in further detail below, the inner body 104 can extend into the interior space of the outer body 102 where it can be secured by one or more inner body struts (not shown).

The inner body 104 may extend beyond the fluid inlet 106 a distance in the fore direction, as illustrated. The length at which the inner body 104 extends beyond the fluid inlet 106 and the diameter of the outer body 102 (e.g., the inner diameter) can define an L/D ratio of the fluid sensing device 100. The L/D ratio range is a design parameter and may vary based on specific application. For example, in some embodiments, the L/D ratio may vary from 0.1 to 5, or from 0.25 to 3, or from 0.5 to 1.5. For example, in some embodiments, the L/D ratio may be 0.1, 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0.

The diameter of the outer body 102 (e.g., the inner diameter of the outer body) and the diameter of the inner body 104 (e.g., the outer diameter of the inner body) can define a $D_o/D_i$ ratio of the fluid sensing device 100. The $D_o/D_i$ ratio range is a design parameter and may vary based on specific application. For example, in some embodiments, the $D_o/D_i$ may range from 1.25 to 5, or from 1.5 to 3. For example, in some embodiments, the $D_o/D_i$ ratio may be 1.25, 1.5, 1.75, 2.0, 2.25, 2.5, 2.75, 3.0, 3.25, 3.5, 3.75, 4.0, 4.25, 4.5, 4.75, or 5.0.

As illustrated, the outer body 102 and/or inner body 104 can be formed with circular and/or curved cross-sections. In other embodiments, an outer body 102 and/or inner body 104 may be formed with an ovoid cross-section, an ellipsoid cross-section, or with a triangular, square, rectangular, or other polygonal cross-section. The inner body 104 may have a contour that tapers in the fore direction, as shown. For example, the contour may be formed with an ellipsoid of revolution shape or ogive shape (e.g., tangent ogive, elliptical ogive, von Kármán ogive, or other shapes). The inner body 104 may be coaxially aligned with the outer body 102, as in the illustrated embodiment. In other embodiments, an inner body may be offset from a longitudinal axis of an outer body and/or may have a longitudinal axis that is transverse to a longitudinal axis of an outer body.

As described in more detail below, the fluid sensing device 100 may include an aft body 112 at least partially disposed near an aft side 110 of the fluid sensing device 100. As shown, the aft body 112 may extend a distance beyond the outer body 102 in an aft direction. In other embodiments, the aft body 112 may be disposed fully within the outer body 102. The aft body 112 may be formed with a circular cross-section, as shown (e.g. as a stagnation tube). In other embodiments, an aft body can be formed with an ovoid cross-section, or with a triangular, square, rectangular, or other polygonal cross-section. The aft body 112 may be coaxially aligned with the outer body 102, as shown. In other embodiments, an aft body may be offset from a longitudinal axis of an outer body and/or may have a longitudinal axis that is transverse to a longitudinal axis of an outer body.

The diameter of the outer body 102 (e.g., the inner diameter) and the diameter of the aft body 112 (e.g., the inner diameter) can define a Do/Da ratio of the fluid sensing device 100. The Do/Da may ratio range is a design parameter and may vary based on specific application. In some embodiments, the Do/Da ratio may range from 1.1 to 5, or from 1.25 to 3. For example, in some embodiments, the Do/Da ratio may be 1.1, 1.25, 1.5, 1.75, 2.0, 2.25, 2.5, 2.75, 3.0, 3.25, 3.5, 3.75, 4.0, 4.25, 4.5, 4.75, or 5.0.

The length of the outer body 102 and the length of the aft body 112 can define a Lo/La ratio of the fluid sensing device 100. The Lo/La ratio is a design parameter and may vary based on specific application. In some embodiments, the Lo/La ratio may range from 1.5 to 4, or from 1.75 to 3.5, or from 2 to 3. For example, in some embodiments, the Lo/La ratio may be 1.5, 1.75, 2.0, 2.25, 2.5, 2.75, 3.0, 3.25, 3.5, 3.75, or 4.0.

Figure 2:
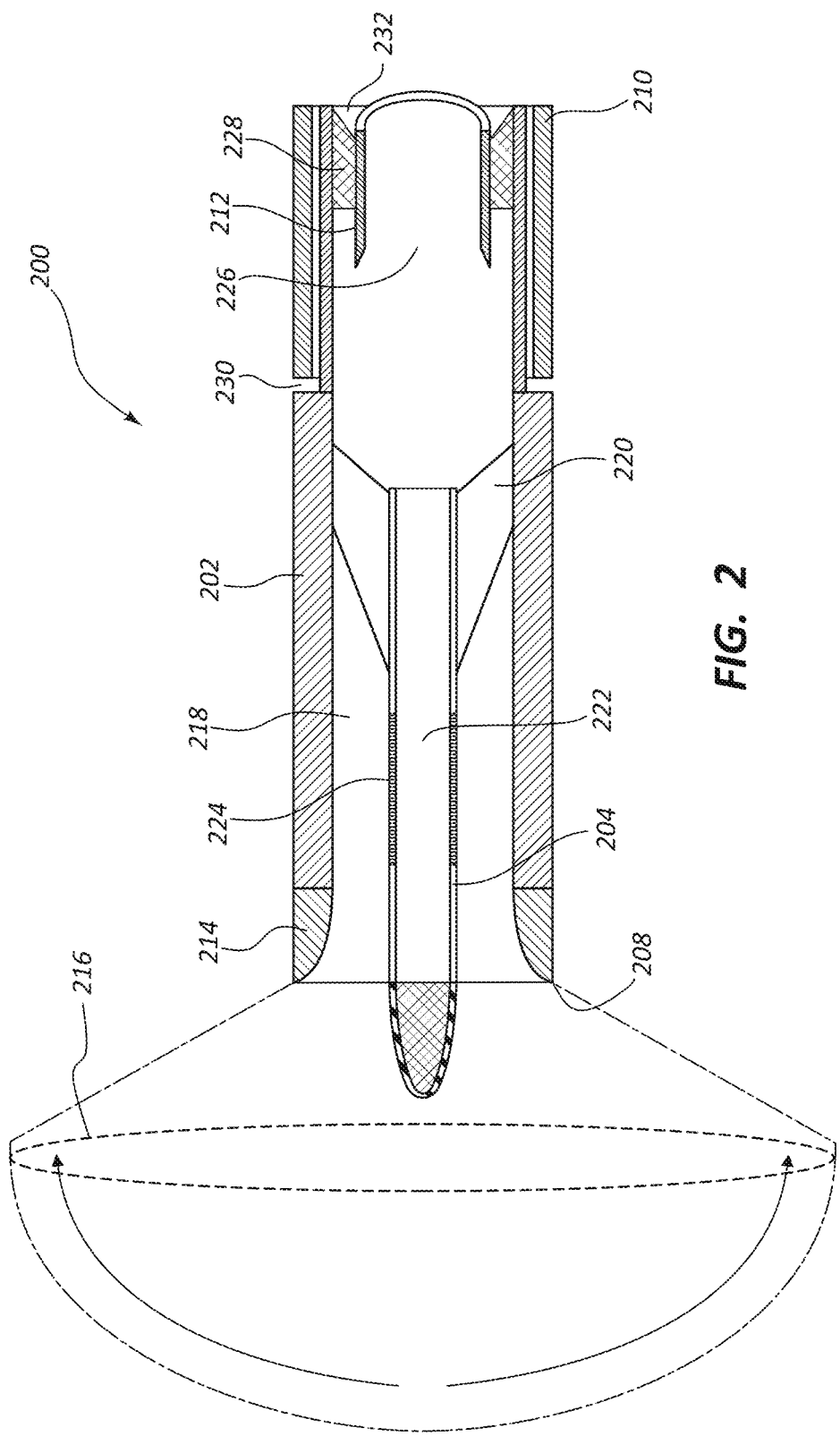
FIGS. 2-4 illustrate cutaway views of embodiments of fluid sensing devices according to the present disclosure.

FIG. 2 illustrates a cutaway view of another embodiment of a fluid sensing device 200. As shown, an outer body 202 can include a contoured lip 214. The contoured lip 214 can be configured to widen the angularity of the fluid capture dome, as represented by line 216. For example, the angled surface of the contoured lip 214 can provide a wider capture angle for receiving fluid into an interior space 218 of the outer body 202. This can beneficially reduce or eliminate sensing errors resulting from high fluid flow angularity (e.g., because of reduced fluid flow into the interior space 218 of the outer body 202). The contoured lip 214 can have an elliptic or any other curved contour, as illustrated. In other embodiments, a contoured lip can have a straight edge and/or non-curved taper.

The illustrated fluid sensing device 200 can include one or more inner body struts 220 configured to secure an inner body 204 to the outer body 202. The fluid sensing device 200 may include two inner body struts 220, which may be oppositely disposed (e.g., separated by 180 degrees), as illustrated. In other embodiments, a fluid sensing device may include a single inner body strut or may include a plurality of inner body struts arranged around an inner body (e.g., separated by 30, 60, 90, 120, or 150 degrees).

The inner body struts 220 may have a tapered and/or winged shape, with a portion coupled to the inner body 204 being wider than a portion coupled to the outer body 202, as illustrated. The inner body struts 220 may angle toward the aft side 210, as illustrated. In other embodiments, one or more inner body struts may not taper, or may be wider at a portion coupling to an outer body than at a portion coupling to an inner body. In other embodiments, one or more inner body struts may angle toward a fore side or may not angle toward a fore or aft side.

The inner body 204 may have a hollow interior 222, as illustrated. The inner body 204 may include a fluid permeable surface 224 covering at least a portion of the surface of the inner body 204. The fluid permeable surface 224 can be configured to allow the passage of fluid from the interior space 218 and/or from outside of the fluid sensing device 200 into the hollow interior 222 of the inner body 204. For example, in some embodiments, the fluid permeable surface 224 can be formed as a perforated wall. In other embodiments, a fluid permeable surface can include slots, holes, slits, channels, and/or other passages allowing fluid to pass from an interior space to a hollow interior within an inner body.

The illustrated fluid sensing device 200 includes an aft body 212 disposed in an aft direction relative to the inner body 204 (e.g., disposed on an aft side of the inner body). As shown, the aft body 212 can include an opening 226 facing the fore side 208 and configured to receive fluid flowing toward the aft side 210. The aft body 212 can be secured to the outer body 202 by one or more aft body struts 228. The fluid sensing device 200 may include two aft body struts 228, which may be oppositely disposed (e.g., separated by 180 degrees), as illustrated. In other embodiments, a fluid sensing device may include a single aft body strut or may include a plurality of aft body struts arranged around the aft body (e.g., separated by 30, 60, 90, 120, or 150 degrees).

As illustrated, the fluid sensing device 200 may include one or more static ports 230 disposed within a sidewall of the outer body 202. The one or more static ports 230 can be configured to sample pressure outside the direct fluid flow path in order to measure static pressure of the fluid environment (e.g., atmospheric pressure in aircraft applications). For example, one or more static ports 230 may lead to and/or be connected to a static pressure sensor (not shown).

The fluid sensing device 200 can include one or more vents 232 opening at the aft side 210 of the fluid sensing device 200. The one or more vents 232 can be configured to allow passage of fluid through and/or out of the interior space 218. As illustrated, the one or more vents 232 can be defined by a space between the aft body 212 and an inner surface of the outer body 202. In other embodiments, one or more vents may be defined by channels, grooves, and/or other conduits leading out of an interior space of a fluid sensing device (e.g., leading out through an aft side).

The one or more vents 232 may be configured to facilitate greater throughflow rates. For example, in operational environments of high/low fluid flow velocity and/or high flow angularity relative to the fluid sensing device, increased throughflow rates may beneficially reduce measurement error resulting from reduced and/or insufficient fluid capture by the fluid sensing device 200. In some embodiments, one or more vents 232 may be adjustable and/or closable. For example, in some embodiments, a user may selectively adjust and/or close one or more vents in order to alter the throughflow levels within the fluid sensing device.

Figure 3:
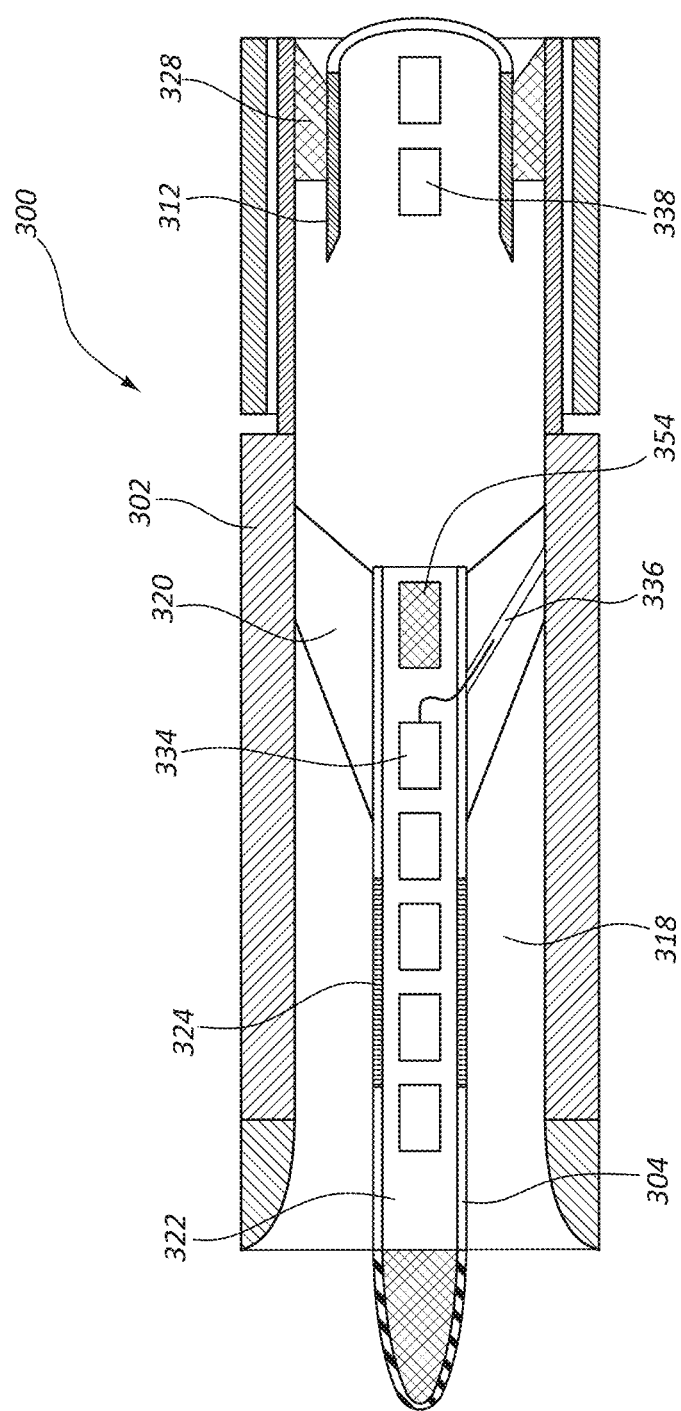

FIG. 3 illustrates a cutaway view of another embodiment of a fluid sensing device 300. As shown, the fluid sensing device 300 may include an outer body 302, an inner body 304 partially disposed within an interior space 318 and secured to the outer body 302 by inner body struts 320, and an aft body 312 partially positioned within the interior space 318 and secured to the outer body 302 by aft body struts 328. The inner body 304 can be formed with a hollow interior 322. As illustrated, the hollow interior 322 can house one or more inner body sensors 334. The one or more inner body sensors 334 may include, for example, one or more of a temperature sensor (e.g., thermocouple), rate gyro, GPS unit, accelerometer, radar device, pressure sensor (e.g., static pressure sensor), magnetometer, timing clock, and/or optical sensor.

As illustrated, the inner body 304 may include a fluid permeable surface 324 disposed along at least a portion of the surface of the inner body 304. The fluid permeable surface 324 can be configured to allow passage of fluid into the hollow interior 322. For example, the fluid permeable surface 324 can allow fluid into the hollow interior 322 in order to bring fluid into contact with the one or more inner body sensors 334 disposed within the inner body 304. In some embodiments, for example, the inner body 304 and/or fluid permeable surface 324 may be configured to allow sufficient fluid contact with the one or more inner body sensors 334 while shielding the inner body sensors 334 from high fluid flows capable of damaging the inner body sensors 334 and/or causing erroneous readings by the inner body sensors 334. In some embodiments, the hollow interior 322 is configured as a stagnation zone, allowing inner body sensors 334 to make measurements requiring a stagnation environment.

In some embodiments, the fluid permeable surface 324 can be configured to allow proper functioning of one or more inner body sensors 334. For example, a fluid permeable surface 324 may be configured with one or more holes or other apertures so as to allow a radar and/or optical sensor to send and/or receive data signals, for example. Heat sinks may be installed in the inner body 304 and/or fluid permeable surface 324 to improve functionality of sensors and processors.

The illustrated embodiment may also include a conduit 336. The conduit 336 can be configured to provide passage for wiring and/or other connections between the hollow interior 322 and the outer body 302. For example, the conduit 336 can allow wiring to pass from the one or more sensors 334 to the outer body 302 and/or beyond the outer body 302. As shown, the conduit 336 can be coupled to an inner body strut 320. In such a configuration, the inner body strut 320 can provide structural support to the conduit 336.

The fluid sensing device 300 may also include one or more aft body sensors 338 disposed within the aft body 312. The one or more aft body sensors 338 may include, for example, one or more temperature sensor, rate gyro, GPS unit, accelerometer, radar device, pressure sensor, magnetometer, timing clock, and/or optical sensor. For example, in some embodiments, the fluid sensing device 300 may include a temperature sensor and a pressure sensor for measuring total temperature and total pressure, respectively.

The hollow interior 322 (or the probe's base) can include a processor 354 configured to provide real-time signal processing, analysis, and/or filtering of sensor readings. The processor 354 can be positioned, for example, within the hollow interior 322. The processor 354 can be configured to receive input from at least one sensor (e.g., from one or more inner body sensors 334 and/or one or more aft body sensors 338) within the fluid sensing device 300. Based on the received input (e.g., an input of static pressure, total temperature, and total pressure), the processor 354 may calculate one or more outputs. For example, the processor 354 may calculate a flow/flight Mach number, a fluid static temperature, entropy (including local entropy), other time-resolved data, local speed of sound, fluid static density, flow dynamic pressure, flow/flight speed, unit Reynolds number, other outputs, or combinations thereof. The illustrated embodiment can advantageously measure total temperature and total pressure locally and/or simultaneously within the same fluid sensing device 300, allowing for the calculation of local entropy.

Figure 4:
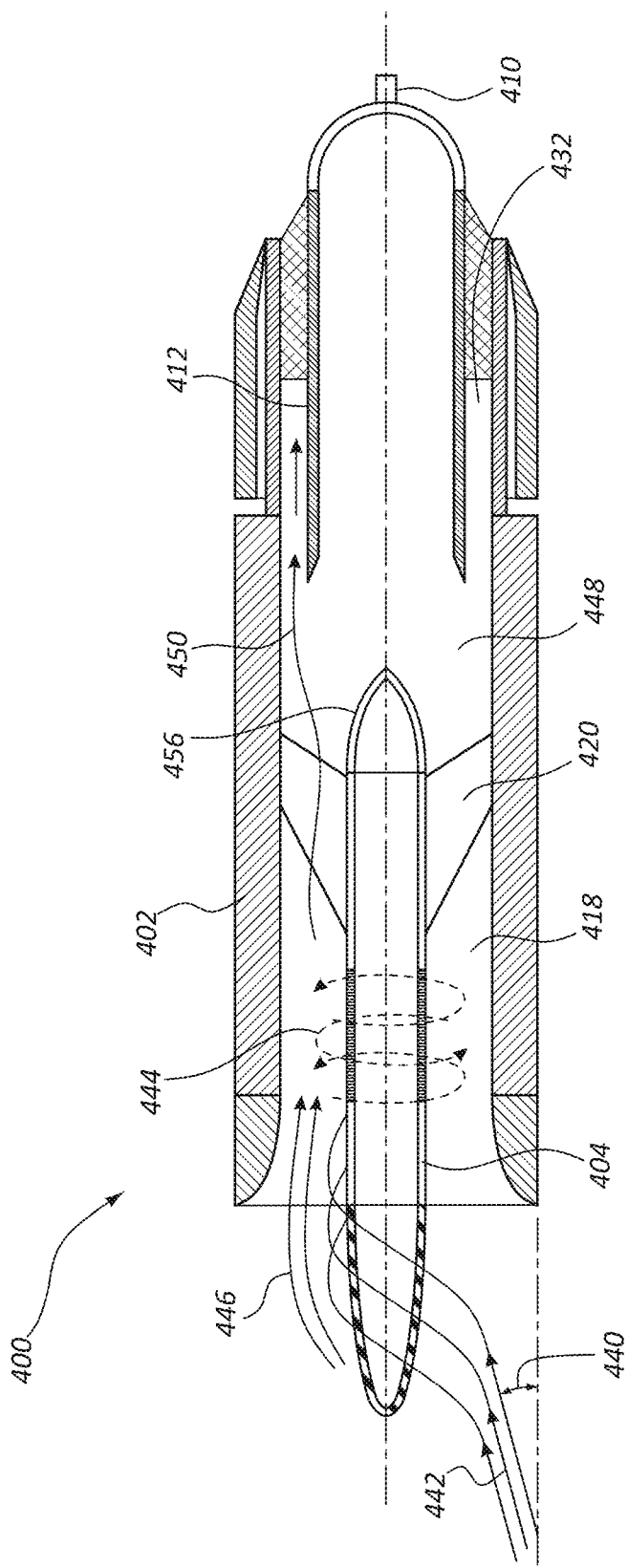

FIG. 4 illustrates a cutaway view of an embodiment of a fluid sensing device 400 including an outer body 402 and an inner body 404. The inner body 404 can be secured to the outer body 402 by one or more inner body struts 420. As shown, the inner body 404 can project a distance out from the outer body 402 in a fore direction. The inner body 404 can be configured in size, shape, and/or surface texture to induce the Coanda effect in at least a portion of a fluid contacting the inner body 404 at an angle transverse to a longitudinal axis of the inner body 404. For example, fluid flow 442 contacting the inner body 404 at a flow angle 440 can be induced to wrap around the surface of the inner body 404 and/or be channeled into an interior space 418 of the fluid sensing device 400.

In some embodiments, the resulting fluid flow can form a swirl 444 within the interior space 418. Movement of the swirl 444 through the interior space 418 toward an aft side 410 may induce vortex ingestion of additional fluid flow 446 into the interior space 418. This can further enhance the fluid intake into the interior space 418 to further reduce or eliminate error in fluid parameter sensing (e.g., in total pressure measurements).

The inner body struts 420 can act on the swirl 444 to remove the kinetic energy of the swirl 444 and convert it to static pressure rise. For example, as a swirl 444 passes through the interior space 418 toward the aft side 410 of the fluid sensing device 400, the inner body struts 420 can break up the swirl 444. Fluid continuing past the inner body struts 420 can then enter a diminished swirl zone 448 as diminished swirl fluid 450. As shown, the diminished swirl fluid 450 can be more longitudinally oriented relative to the swirl 444, allowing passage of the diminished swirl fluid 450 into the aft body 412 and/or through one or more vents 432. In addition, the inner body 404 can include a tapered aft portion 456. The tapered aft portion 456 can be configured to allow and/or direct fluid flow more directly toward and/or into the aft body 412.

Figure 5:
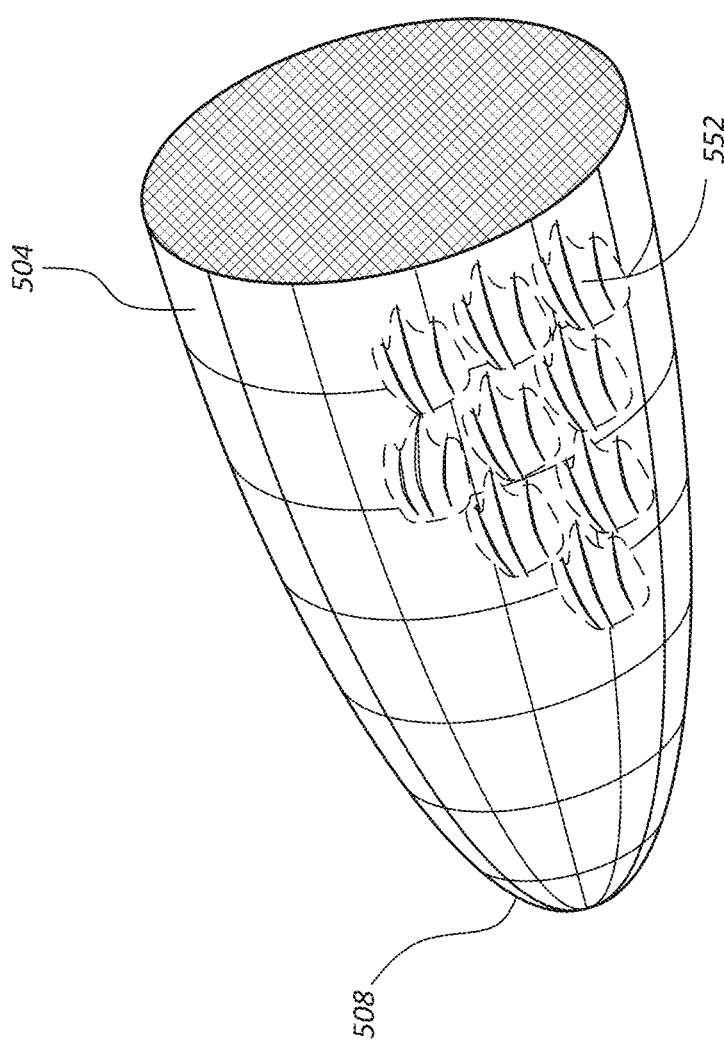
FIG. 5 illustrates an embodiment of an inner body according to the present disclosure showing a surface feature of the inner body.

FIG. 5 illustrates an embodiment of a portion of an inner body 504 having a fore side 508 and including a surface feature 552. The surface feature 552 can be configured to generate micro-vortexes in fluid contacting and/or flowing past the inner body 504. As shown, the surface feature 552 can cover a portion of an outer surface of the inner body 504. In other embodiments, a surface feature can cover the entirety of an outer surface of an inner body, or can cover a fraction of an outer surface of an inner body, such as 10%, 20%, 30%, 40%, 50%, 60%, 70%, 80%, 90%, or any other percentage of the outer surface of the inner body.

The surface feature 552 can be formed as a "shark skin" texture, including a plurality of overlapping and/or inter-locking segments having grooved and/or channeled surfaces, as illustrated. Other embodiments can include a surface feature including one or more grooves, patterns, ridges, posts, and/or other textures suitable for disrupting and/or generating micro-vortexes in fluid flow contacted with the surface feature. In some embodiments, the surface feature 552 may advantageously promote increased fluid flow into an interior space of a fluid sensing device through improved flow attachment to the inner body 504 and/or enhanced Coanda effect.

Figure 6:
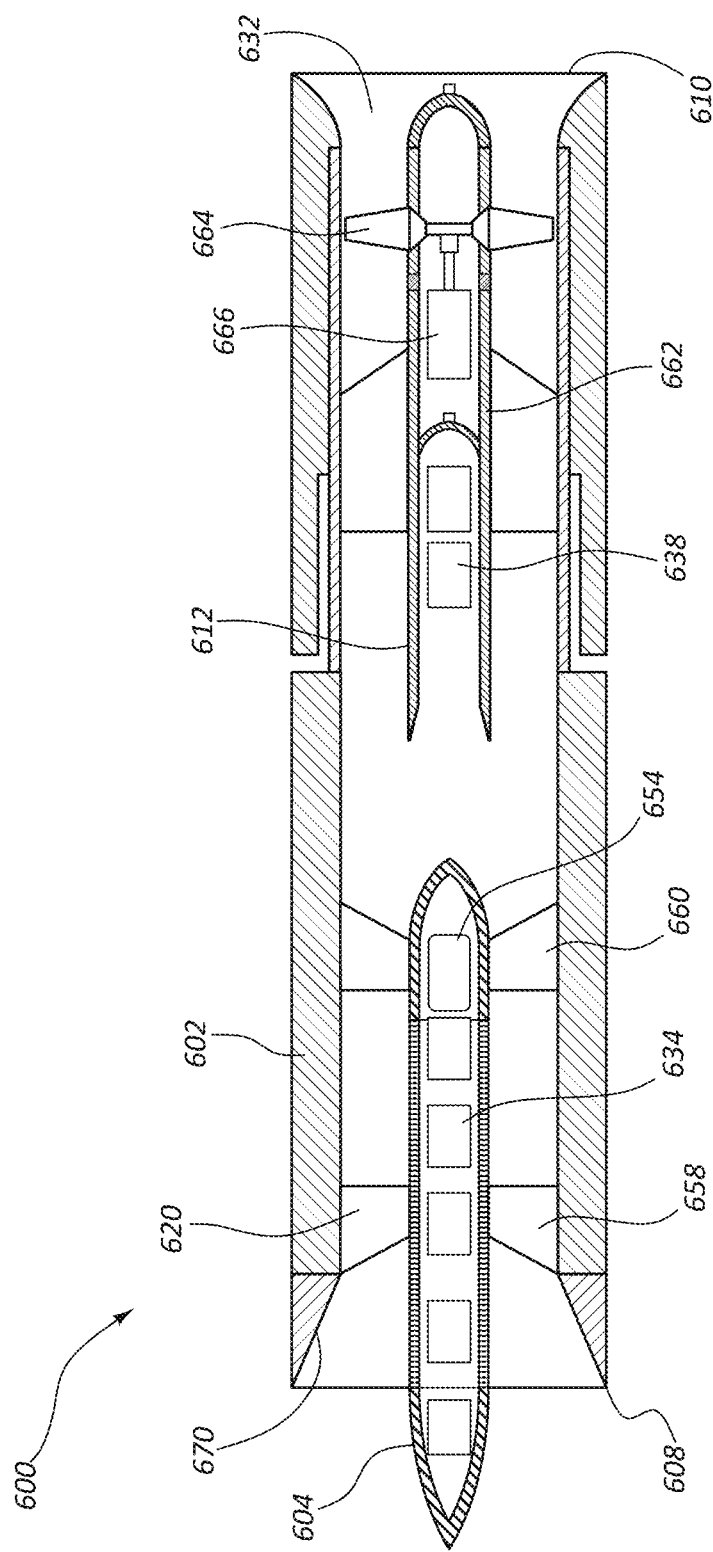
FIGS. 6-7 illustrate cutaway views of embodiments of fluid sensing devices including power compartments according to the present disclosure.

FIG. 6 illustrates another embodiment of a fluid sensing device 600 including an outer body 602, an inner body 604, and an aft body 612. As shown, the inner body 604 may be secured to the outer body 602 by one or more inner body struts 620. In the illustrated embodiment, a first set 658 of inner body struts 620 can be disposed at a portion of the inner body 604 closer to the fore side 608 of the fluid sensing device 600. A second set 660 of inner body struts 620 can be disposed further toward the aft side 610 of the fluid sensing device relative to the first set 658.

The fluid sensing device 600 may include a power compartment 662 disposed aft of the aft body 612. As illustrated, the power compartment 662 can be coupled to the aft body 612. For example, an outer shell forming the aft body 612 can extend as an integral piece to form the power compartment 662. In other embodiments, a power compartment may be separated from an aft body. As shown, the power compartment 662 can be coaxially aligned with the aft body 612. In other embodiments, a power compartment may be offset from an aft body. For example, a power compartment may be positioned above, below, or on a side of an aft body. Additionally, or alternatively, a power compartment and/or aft body can be offset so as not to be coaxially aligned with an outer body.

The power compartment 662 may include one or more turbines 664 optionally coupled to a generator 666. As illustrated, one or more turbines 664 may be positioned such that the turbines 664 (or at least one turbine 664) extend into one or more vents 632. For example, a turbine 664 can have a diameter (e.g., double the length of a turbine blade) that is greater than a diameter of the power compartment 662 and/or aft body 612 and less than or equal to an inner diameter of the outer body 602. The one or more turbines 664 can be configured to rotate in either direction. Some embodiments may include a counter-rotating array of turbines. For example, one or more turbines may be configured to rotate in a first direction and one or more turbines may be configured to rotate in a second direction.

Fluid flowing through the vents 632 and past the one or more turbines 664 can contact and rotate one or more turbines 664. Power generated by the rotation of the one or more turbines 664 can be converted into and/or stored as electrical energy by the generator 666 (e.g., in conjunction with an electrical energy storage system including capacitors and/or batteries). In some embodiments, the power compartment 662 may be used as an in-situ power source for powering one or more inner body sensors 634, one or more aft body sensors 638, and/or a processor 654. Such embodiments can advantageously eliminate or reduce the need for an external power source. For example, such embodiments can reduce the risk of disconnection and/or sensor failure and/or can reduce electro-magnetic interference with the one or more sensors and/or with other electrical components of the fluid sensing device.

Power generated and/or stored by the power compartment 662 can be used to power one or more thermal management elements, such as electric heating elements and/or heating tapes (e.g., graphite foil). For example, the outer body 602 and/or inner body 604 may include one or more electric heating elements and/or heating tapes for de-icing, such as in high altitude and/or cold air applications or other applications where thermal control is desirable. Other embodiments may include one or more thermal management elements fully or partly powered by an external power source.

The illustrated embodiment may also include a mixed-compression inlet 670 that may be configured, for example, to operate in supersonic flow conditions. For example, the mixed-compression inlet 670 can be configured to provide adequate operational stability at Mach numbers ranging from 2 to 4 or from 3 to 6. The mixed-compression inlet 670 can be configured to allow the flow entering the fluid sensing device 600 to remain supersonic through a portion of the fluid sensing device 600, with the terminal shock being located within the fluid sensing device 600 at a location defined by the geometry of the mixed-compression inlet 670 and/or inner body 604.

Figure 7:
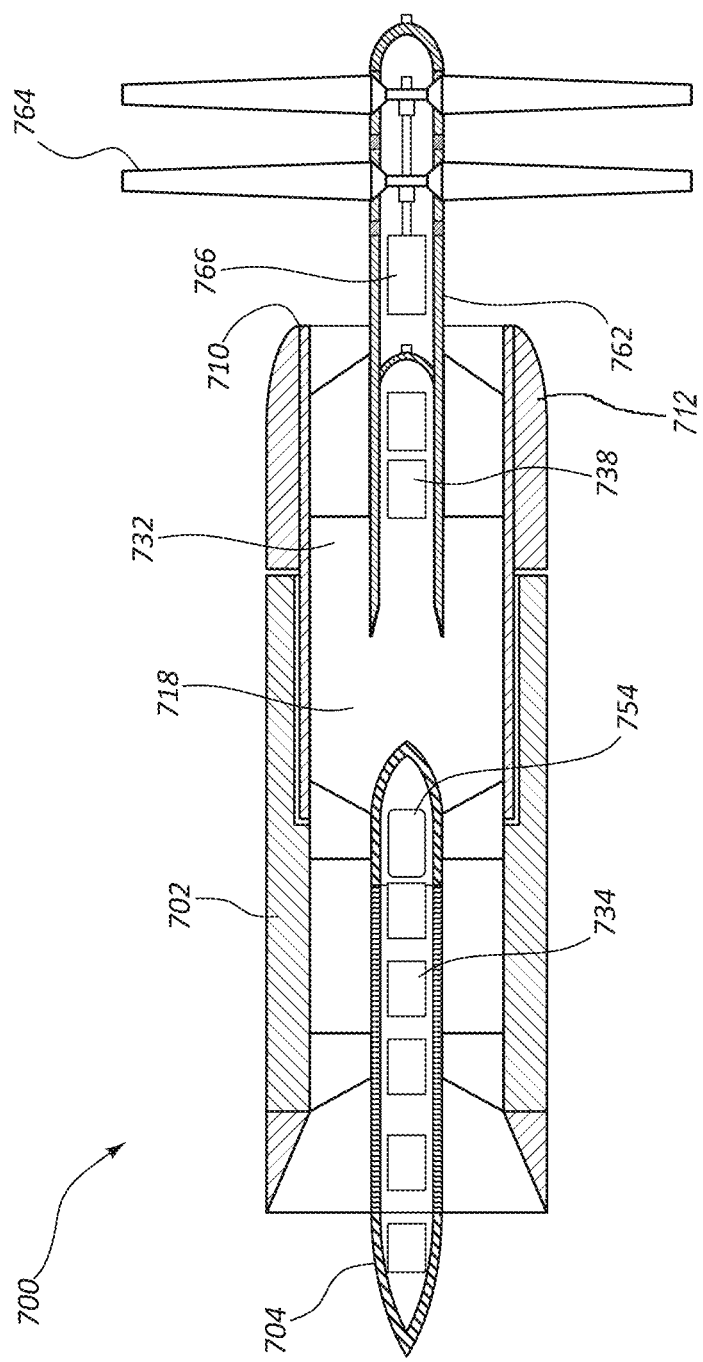

FIG. 7 illustrates another embodiment of a fluid sensing device 700 having an outer body 702, an inner body 704, an aft body 712, and a power compartment 762. As shown, the power compartment 762 can extend out of the outer body 702 beyond an aft side 710 of the outer body 702. The power compartment 762 can include one or more turbines 764 optionally coupled to a generator 766. The one or more turbines 764 can be configured to rotate in either direction. Some embodiments may include a counter-rotating array of turbines. For example, one or more turbines may be configured to rotate in a first direction and one or more turbines may be configured to rotate in a second direction.

As shown in this embodiment, the one or more turbines 764 can extend so as to reach beyond an inner diameter of the outer body 702. For example, one or more turbines 764 can have a diameter (e.g., a length double the length of a turbine blade) that is greater than or equal to the inner diameter of the outer body 702, or that is greater than or equal to an outer diameter of the outer body 702. In some embodiments, a turbine 764 may have a diameter that is from 1 to 5 times, from 1.25 to 3.5 times, or from 1.5 to 2.5 times the outer diameter of the outer body 702, for example.

Fluid flowing through the vents 732 and/or flowing from outside an interior space 718 (e.g., flowing over the outer body 702) can actuate one or more turbines 764. Power generated by the rotation of the one or more turbines 764 can be converted into and/or stored as electrical energy by the generator 766 (e.g., in conjunction with an electrical energy storage system including capacitors and/or batteries). In some embodiments, the power compartment 762 may be used as an in-situ power source for powering one or more inner body sensors 734, one or more aft body sensors 738, and/or a processor 754.

Figure 8:
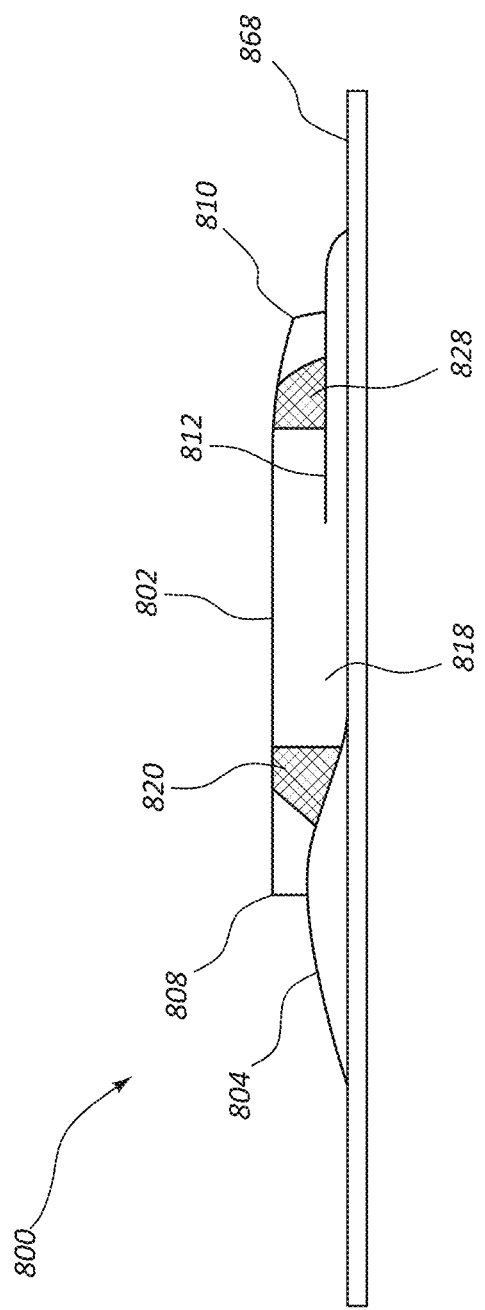
FIG. 8 illustrates an embodiment of a fluid sensing device according to the present disclosure suitable for attachment to a surface.

FIG. 8 illustrates another embodiment of a fluid sensing device 800. The fluid sensing device 800 can be configured to be positioned on and/or into a surface 868. The surface 868 may be, for example, a portion of an aircraft or marine craft (e.g., a wing or empennage). The fluid sensing device 800 can be used, for example, for sensing and/or detecting surface effects such as local entropy, icing, asymmetries, force differentials, moment differentials, and/or unsteady nonlinear aerodynamics. As illustrated, the fluid sensing device 800 can include an outer body 802, an inner body 804, and an aft body 812. The outer body 802, inner body 804 and/or aft body 812 can be joined to the surface 868. In addition, the outer body 802 and inner body 804 may be joined by one or more inner body struts 820 and/or the outer body 802 and aft body 812 may be joined by one or more aft body struts 828.

As described above with respect to other fluid sensing device embodiments, the fluid sensing device 800 can be configured to receive fluid flow into an interior space 818 as it passes from a fore side 808 toward an aft side 810. As with other embodiments described above, the fluid sensing device 800 can include one or more inner body sensors (not shown) and/or one or more aft body sensors (not shown) for measuring one or more fluid parameters (e.g., total temperature, total pressure, static pressure).

In some embodiments, a fluid sensing device can be calibrated to improve the accuracy of sensor readings. For example, a fluid sensing device can be calibrated to improve the accuracy of a total pressure measurement by determining an amount of pressure lost due to drag associated with the inner body and adding it to the measured total pressure. For example, in embodiments where a total pressure sensor is located aft (i.e., downstream) of an inner body, the pressure measured by the pressure sensor ($P_{t0}'$) may be lower than a freestream total pressure ($P_{t0}$) due to inner body drag (($\Delta P_t$)$_D$). Thus, in some embodiments, a fluid sensing device can be calibrated based on the following correction:

$$P_{t0}=P_{t0}'+(\Delta P_t)_D$$

In some embodiments, the inner body drag (($\Delta P_t$)$_D$) can be determined by comparing wind tunnel results of a fluid sensing device including an inner body with wind tunnel results of a device omitting an inner body. In some embodiments, inner body drag (($\Delta P_t$)$_D$) can be calculated according to the following formula:

$$(\Delta P_t)_D=(\Delta P_t)_{D0}+\delta[(\Delta P_t)_{D0}]_{\theta\neq 0}$$

where $(\Delta P_t)_{D0}$ is the inner body drag at a flow angle of zero and $\delta[(\Delta P_t)_{D0}]_{\theta\neq 0}$ is an incremental correction at flow angles other than zero.

Figure 12:
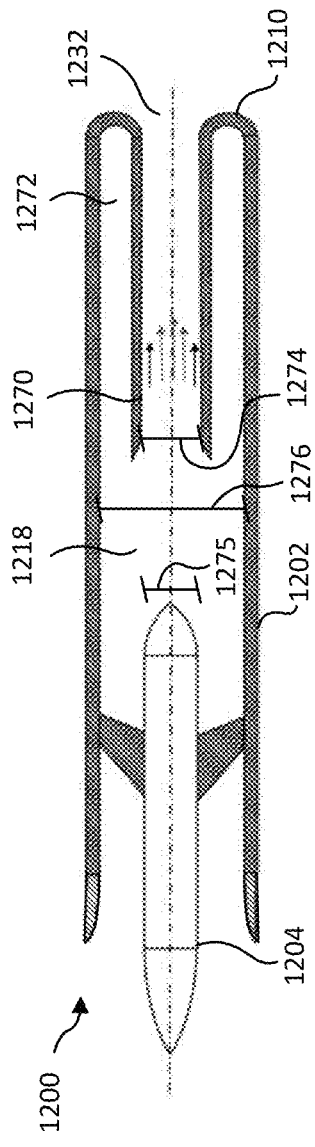
FIG. 12 is a side cross-sectional view of an embodiment of a fluid sensing device with a constrained aft vent according to the present disclosure.

FIG. 12 is a side partially cross-sectional view of a fluid sensing device 1200 having an outer body 1202 and an inner body 1204. The outer body 1202 has an internal aft portion 1270 where the outer body 1202 folds inward and defines an annular stagnation zone 1272 at the aft side 1210 of the fluid sensing device 1200. The annular stagnation zone 1272 at the aft side 1210 may create a backpressure and/or restrict flow through the 1232, providing a more stable environment for the sensors housed in the inner body 1204 or other portion of the fluid sensing device 1200.

The annular stagnation zone 1272 surrounds the aft vent 1232, through which fluid flow may exit the fluid sensing device 1200. In some embodiments, the aft side geometry of embodiments described in relation to FIG. 12 may improve the quality of the sensor readings at the aft end of the device. For example, the aft side geometry may avoid a wake effect that causes noise in the signal when the sensor is behind the inner body 1204. The annular stagnation zone 1272 may further improve signal quality by allowing the use of a plurality of sensors positioned in the stagnation zone 1272 around the aft vent 1232. The plurality of sensors may provide a calculated average, rather than relying on a single signal from a single sensor, to reduce noise and other statistical anomalies, such as vibrations.

The internal aft portion 1270 has an inner diameter 1274 that determines the diameter of the aft vent 1232. The aft portion inner diameter 1274 may be related to an outer diameter 1275 of the inner body 1204 positioned forward of the internal aft portion 1270. In some embodiments, the aft portion inner diameter 1274 is the same as the inner body outer diameter 1275. In other embodiments, the aft portion inner diameter 1274 is greater than the inner body outer diameter 1275. In yet other embodiments, the aft portion inner diameter 1274 is less than the inner body outer diameter 1275.

The aft portion inner diameter 1274 may be related to an inner diameter 1276 of the outer body 1202. In some embodiments, the aft portion inner diameter 1274 and the outer body inner diameter 1276 define a $D_I/D_O$ ratio in a range having an upper value, a lower value, or upper and lower values including any of 0.1, 0.2, 0.3, 0.4, 0.5, 0.6, 0.7, 0.8, 0.9, or any values therebetween. For example, the $D_I/D_O$ ratio may be greater than 0.1. In other examples, the $D_I/D_O$ ratio may be less than 0.9. In yet other examples, the $D_I/D_O$ ratio may be between 0.1 and 0.9. In further examples, the $D_I/D_O$ ratio may be between 0.25 and 0.75. In at least one example, the $D_I/D_O$ ratio may be about 0.5.

The aft portion inner diameter 1274 may be related to an annular diameter between the outer body 1202 and the inner body 1204 (i.e., a difference between the outer body inner diameter 1276 and the inner body outer diameter 1275). For example, the aft portion inner diameter 1274 defines an outlet area and the annular diameter defines an intake area. In some embodiments, the intake area and the outlet area define a I/O ratio in a range having an upper value, a lower value, or upper and lower values including any of 0.5, 0.75, 1.0, 1.25, 1.5, 1.75, 2.0, or any values therebetween. For example, the I/O ratio may be greater than 0.5. In other examples, the I/O ratio may be less than 2.0. In yet other examples, the I/O ratio may be between 0.5 and 2.0. In further examples, the I/O ratio may be between 0.75 and 1.5. In at least one example, the I/O ratio may be about 1.0.

Figure 13:
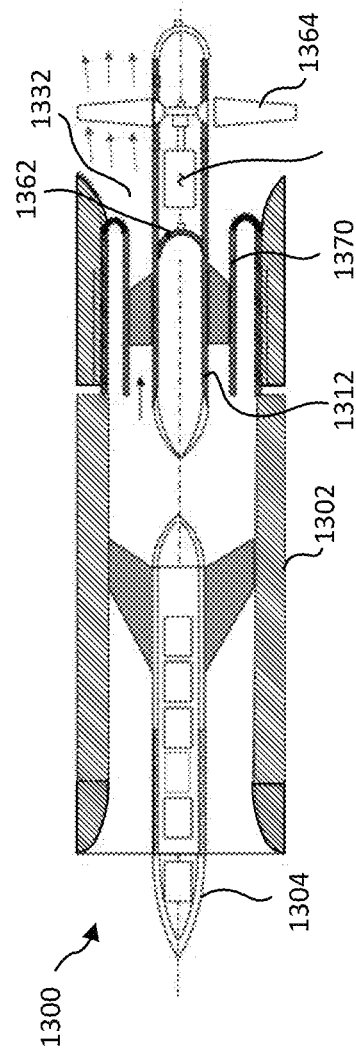
FIG. 13 is a side cross-sectional view of an embodiment of a fluid sensing device with a constrained aft vent and a power scavenging device according to the present disclosure.

FIG. 13 is a side cross-sectional view of another embodiment of a fluid sensing device 1300 having an outer body 1302, an inner body 1304, and an aft body 1312. The aft body 1312 includes a power compartment 1362 including one or more turbines 1364 coupled to and configured to rotate part of a generator 1366 and generate power for the fluid sensing device 1300. The fluid sensing device 1300 includes an interior aft portion 1370 that may be similar to the interior aft portion 1270 described in relation to FIG. 12. The power compartment 1362 and aft body 1312 may be positioned radially within the interior aft portion 1370 of the outer body 1302. For example, when the aft body 1312 is positioned longitudinally overlapping the interior aft portion 1370 and within the aft vent 1332, the aft body 1312 is considered to be radially within the interior aft portion 1370 of the outer body 1302.

The position of the aft body 1312 within the aft vent 1332 of the interior aft portion 1370 reduces the outlet area, relative to the outlet area illustrated in FIG. 12. In some embodiments, the I/O ratio of the fluid sensing device 1300 with the aft body 1312 positioned radially within the aft vent 1332 may be greater than the I/O ratio of the fluid sensing device 1200 described in relation to FIG. 12. In other embodiments, the I/O ratio of the fluid sensing device 1300 with the aft body 1312 positioned radially within the aft vent 1332 may be the same as the I/O ratio of the fluid sensing device 1200 described in relation to FIG. 12. In yet other embodiments, due to the back pressure produced by the turbines 1364, the I/O ratio may be less than the I/O ratio of the fluid sensing device 1200 described in relation to FIG. 12. For example, the outlet area may be greater than the intake area to allow the same flow rate through the outlet while the flow is inhibited by the turbines 1364.

Figure 14:
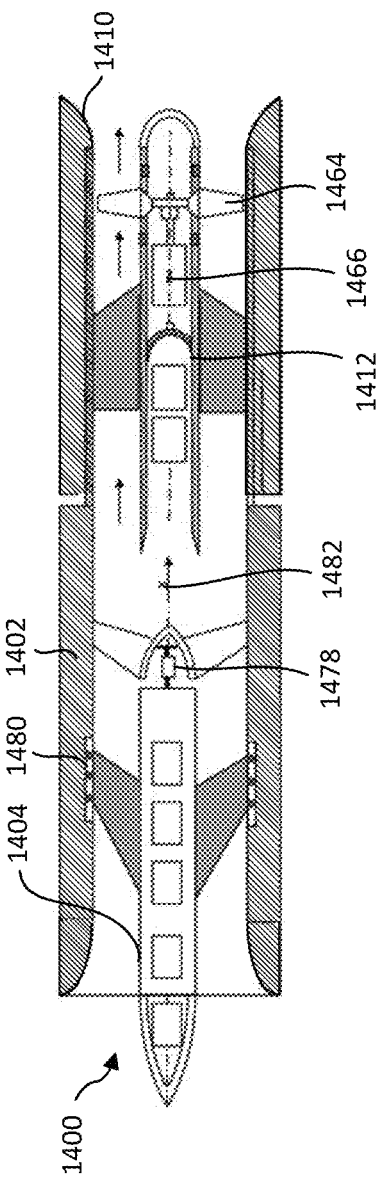
FIG. 14 is a side cross-sectional view of an embodiment of a self-calibrating fluid sensing device according to the present disclosure.

FIG. 14 is a side cross-sectional view of yet another embodiment of a fluid sensing device 1400 according to the present disclosure. The fluid sensing device 1400 has an outer body 1402, an inner body 1404, and an aft body 1412. The inner body 1404 and the aft body 1412 are at least partially radially within the outer body 1402. In some embodiments, the aft body 1412 includes one or more turbines 1464 that generate power via a generator 1466. In other embodiments, the aft side 1410 of the fluid sensing device 1400 includes an interior aft portion, such as described in relation to FIGS. 12 and/or 13.

The inner body 1404, aft body 1412, turbines 1464, interior aft portion, and other structures radially within the outer body 1402 may increase drag of the fluid through the outer body 1402 and pass the sensors of the inner body 1404 and/or aft body 1412. In some embodiments, the sensors are calibrated, as described herein, to compensate for the interior drag of the fluid through the interior space of the outer body 1402. In other embodiments, the fluid sensing device 1400 are self-calibrating or partially self-calibrating.

A fluid sensing device 1400 may include a load sensor 1478 to measure the drag force on the inner body 1404 to allow self-calibration of one or more sensors of the fluid sensing device 1400. The load sensor 1478 may measure the forces applied to the inner body 1404 by the fluid drag forces when the inner body 1404 is movable relative to the outer body 1402. In some embodiments, the inner body 1404 is connected to the outer body 1402 by tracks 1480 or other movable connection that allows the inner body 1404 to move relative to the outer body 1402 in at least one direction. For example, FIG. 14 illustrates an inner body 1404 that is movable relative to the outer body 1404 in an x-direction 1482, and the load sensor 1478 may measure the force in the x-direction 1482. The measured force on the load sensor 1478 may provide information regarding the fluid drag force on the inner body 1404 and allow the fluid sensing device 1400 to self-calibrate.

In other embodiments, a movable connection between the inner body 1404 and the outer body 1402 allows for movement of the inner body 1404 in the x-direction 1482 and rotation about the x-direction 1482. For example, the load sensor 1478 may be an axial load sensor and a torsional load sensor that allows the fluid sensing device 1400 to measure the fluid drag force due to flow through the outer body 1402 in the x-direction 1482 and in the rotational direction due to an induced Coanda effect. The load sensor 1478 may, therefore, collect a more complete measurement of the fluid drag forces on the inner body 1404.

The terms "approximately," "about," and "substantially" as used herein represent an amount or condition close to the stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a stated amount or condition.

In addition, unless expressly described otherwise, all stated amounts (e.g., angle measurements, dimension measurements, etc.) are to be interpreted as being "approximately," "about," and/or "substantially" the stated amount, regardless of whether the terms "approximately," "about," and/or "substantially" are expressly stated in relation to the stated amount(s).

Further, elements described in relation to any embodiment depicted and/or described herein may be combinable with elements described in relation to any other embodiment depicted and/or described herein. For example, any element described in relation to an embodiment depicted in FIGS. 2 through 5 may be combinable with an embodiment described in relation to an embodiment depicted in FIGS. 6 through 8.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

EXAMPLES

The following Example is provided to illustrate one or more operational advantages of the fluid sensing devices of the present disclosure. The particular embodiment used in the following Example is an exemplary embodiment only, and one of skill in the art will recognize that similar beneficial results are expected across the entire scope of embodiments that fall within the present disclosure.

Example 1

Figure 9:
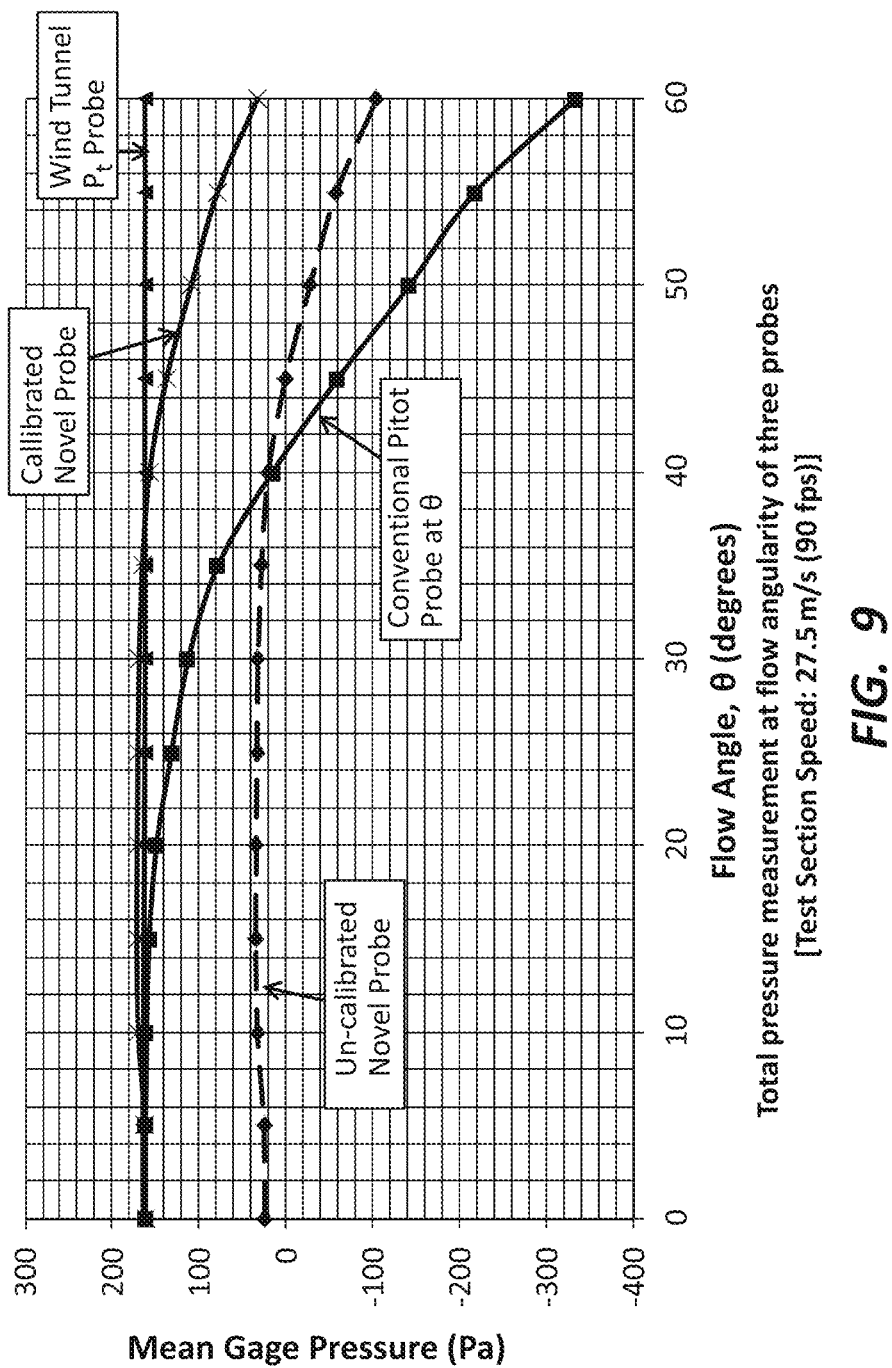
FIGS. 9-11 illustrate results of wind tunnel testing comparing an embodiment of a fluid sensing device according to the present disclosure with a Pitot tube probe.
Figure 10:
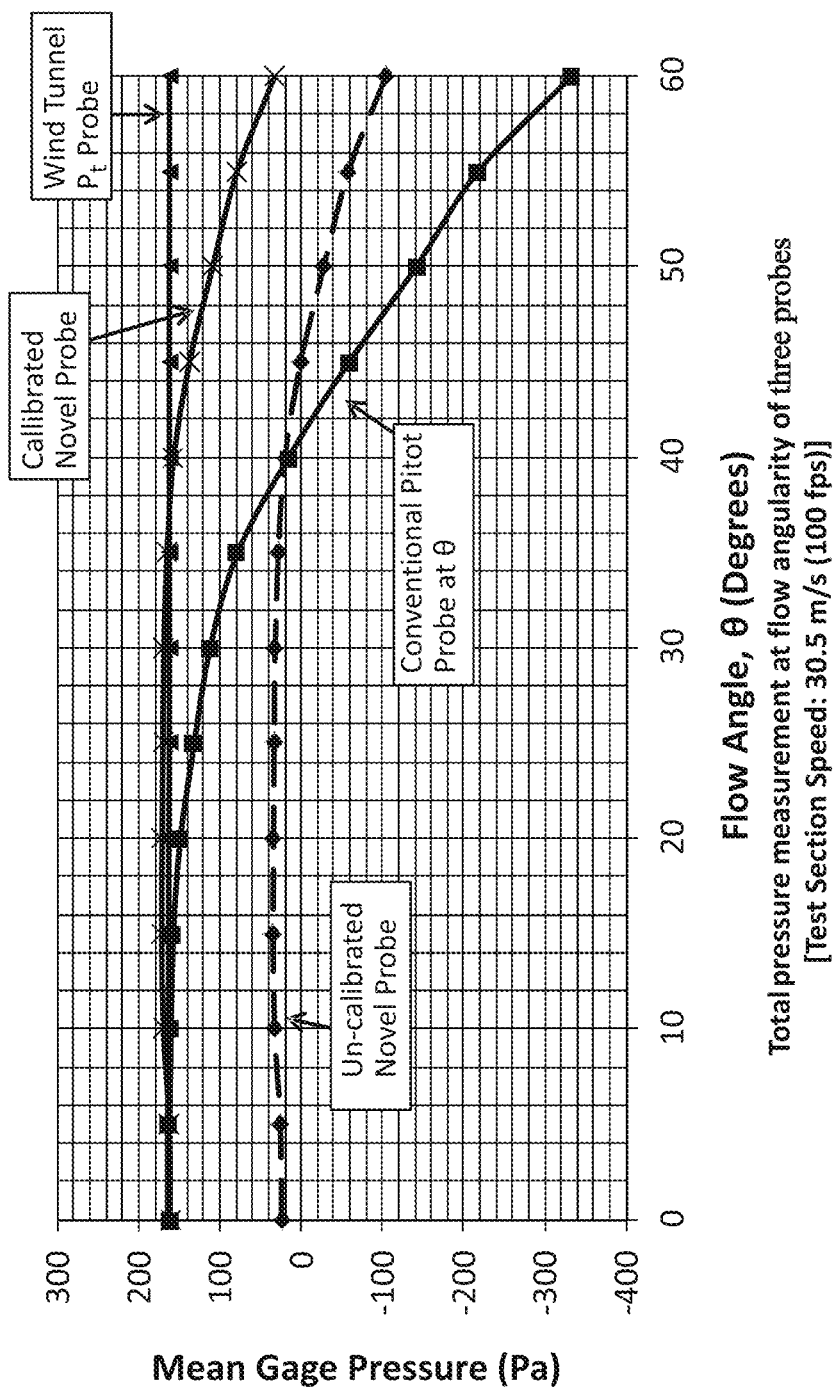
Figure 11:
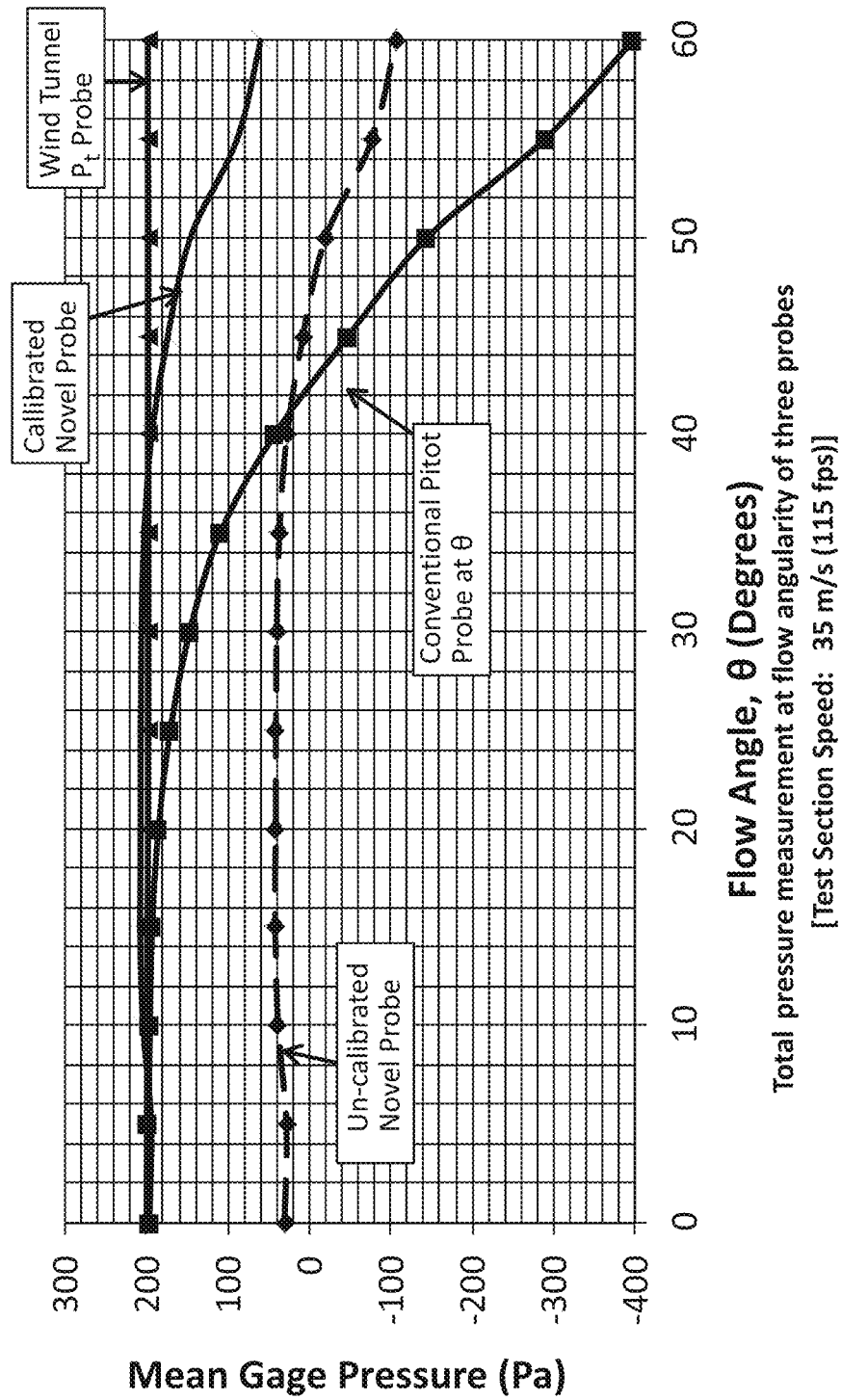

A fluid sensing device according to the present disclosure was installed in parallel with a conventional Pitot tube in a wind tunnel measuring approximately 3 feet high, 4 feet wide, and 6 feet long. The fluid sensing device and the Pitot tube were installed on a turntable that was turned in increments of 5 degrees with respect to the flow direction in the test section. The fluid sensing device included an inner body having an ellipsoid of revolution contour and an L/D ratio of 1.0. The ratio of the outer diameter of the outer body to the diameter of the inner body was 2.0. The outer body included a contoured lip with an elliptic shape having a semi-major to minor axis equal to 2. The fluid sensing device was calibrated to correct for inner body drag. Comparison tests were conducted at wind speeds of 27.5 m/s, 30.5 m/s, and 35 m/s, and the results are shown in FIGS. 9, 10, and 11, respectively.

What is claimed is:

1. A fluid sensing device, comprising:
   an outer body having a fore side, an aft side, and an interior space, the outer body including a fluid inlet disposed at the fore side;
   an inner body extending at least partially out of the fluid inlet of the outer body along a longitudinal axis;
   one or more vents disposed aft of the fluid inlet to allow passage of fluid through the fluid sensing device; and
   at least one load sensor coupled to the inner body to measure a fluid drag force on the inner body,
   wherein the inner body is configured to induce the Coanda effect in at least a portion of a fluid contacting the inner body at an angle transverse to a longitudinal axis of the inner body.

2. The fluid sensing device of claim 1, wherein the load sensor includes an axial load sensor.

3. The fluid sensing device of claim 1, wherein the inner body includes a hollow interior housing one or more inner body sensors.

4. The fluid sensing device of claim 3, wherein the one or more inner body sensors include one or more temperature sensor, rate gyro, GPS unit, accelerometer, radar device, pressure sensor, magnetometer, timing clock, or optical sensor.

5. The fluid sensing device of claim 1, wherein the load sensor includes a torsional load sensor.

6. The fluid sensing device of claim 1, wherein the inner body is movably connected to the outer body and movable relative to the outer body in at least one direction.

7. The fluid sensing device of claim 1, further comprising an aft body positioned at least partially in the interior space of the outer body.

8. The fluid sensing device of claim 7, further comprising a turbine coupled to the aft body, the turbine coupled to a generator to generate power for the fluid sensing device.

9. The fluid sensing device of claim 1, wherein the outer body includes an interior aft portion that defines an annular stagnation zone around an aft vent of the outer body.

10. The fluid sensing device of claim 9, further comprising an aft body positioned radially within the aft vent.

11. The fluid sensing device of claim 10, wherein the aft body includes one or more aft body sensors.

12. The fluid sensing device of claim 11, wherein the one or more aft body sensors include one or more temperature sensor, rate gyro, GPS unit, accelerometer, radar device, pressure sensor, magnetometer, timing clock, or optical sensor.

13. The fluid sensing device of claim 10, further comprising a power compartment disposed aft of the inner body, the power compartment including one or more turbines configured to generate power upon contact with a fluid flowing past the one or more turbines.

14. The fluid sensing device of claim 13, wherein the one or more turbines are disposed within the interior space of the outer body, the one or more turbines having a diameter that is less than or equal to an inner diameter of the outer body.

15. The fluid sensing device of claim 13, wherein the one or more turbines are configured as a counter-rotating array.

16. A fluid sensing device, comprising:
   an outer body having a fore side, an aft side, an interior space, and an interior aft portion that defines an annular stagnation zone, the outer body including a fluid inlet disposed at the fore side and an aft vent disposed at the aft side; and
   an inner body extending along a longitudinal axis, the inner body having a hollow interior housing one or more inner body sensors,
   wherein the inner body is configured to induce the Coanda effect in at least a portion of a fluid contacting the inner body at an angle transverse to a longitudinal axis of the inner body.

17. The fluid sensing device of claim 16, further comprising at least one sensor positioned in the annular stagnation zone.

18. The fluid sensing device of claim 17, wherein an inner diameter of the aft vent is the same as an outer diameter of the inner body.

19. The fluid sensing device of claim 17, wherein an outlet area is the same as an intake area.

20. A fluid sensing device, comprising:
   an outer body having a fore side, an aft side, an interior space, and an interior aft portion that defines an annular stagnation zone, the outer body including a fluid inlet disposed at the fore side;
   an inner body extending at least partially out of a fluid inlet of the outer body along a longitudinal axis, the inner body being movable relative to the outer body;
   one or more vents disposed aft of the fluid inlet to allow passage of fluid through the fluid sensing device;
   an aft body positioned at least partially within the interior space and defining an aft vent around the aft body, the aft vent being between the aft body and the annular stagnation zone; and at least one load sensor coupled to the inner body to measure a fluid drag force on the inner body,
wherein the inner body is configured to induce the Coanda effect in at least a portion of a fluid contacting the inner body at an angle transverse to a longitudinal axis of the inner body.

* * * * *